Oct. 13, 1953      P. J. McCULLOUGH      2,655,095
TOASTER WITH QUICK RELEASE CRUMB TRAY

Filed July 27, 1950      2 Sheets-Sheet 1

INVENTOR
Paul J McCullough
By Rodney Bedell
ATTY.

Oct. 13, 1953    P. J. McCULLOUGH    2,655,095
TOASTER WITH QUICK RELEASE CRUMB TRAY
Filed July 27, 1950    2 Sheets-Sheet 2

INVENTOR
Paul J. McCullough
BY Rodney Bedell
ATT'Y.

Patented Oct. 13, 1953

2,655,095

UNITED STATES PATENT OFFICE 2,655,095

TOASTER WITH QUICK RELEASE CRUMB TRAY

Paul J. McCullough, St. Louis, Mo., assignor to The Toastswell Company, Inc., St. Louis, Mo., a corporation of Missouri Application July 27, 1950, Serial No. 176,150

3 Claims. (Cl. 99—400)

1

The invention relates to bread toasters and is particularly adapted for the familiar domestic electric toaster, the body of which has a box-like casing, including a slice receiving chamber and electric heating elements. Some toasters of this general description have a substantially permanently assembled bottom plate and crumbs or other dirt can only be removed from the toasting chamber by inverting the toaster or by detaching the bottom plate by removing screws or bolts. Some toasters have a crumb tray slidable laterally over the bottom plate into position beneath the toasting chamber or out of the housing for removing such crumbs as may be on the tray.

The present invention comprises a toaster in which the toasting chamber has an open bottom, normally closed by a readily detachable crumb tray which is released and preferably expelled from the housing by simple movement of a releasing member projecting from the housing, and the tray is as readily reassembled with the housing.

The general object of the invention is to facilitate removal of crumbs, etc., from the toaster, without inverting the same and without removing screws or similar holding elements, by releasing the crumb tray from the body and then lifting the body from the tray, leaving the tray resting on a table with its upper surface facing upwardly and with the crumbs, etc., retained thereon, thus avoiding the relatively messy operation of inverting the toaster, or detaching the bottom plate, to dump the crumbs.

Incidental objects are to provide a simple construction of few parts which are readily operable and unlikely to be injured and without detachable elements which are readily lost or misplaced.

These and more specific objects of the invention, as will be apparent from the following description, are attained by the structure illustrated in the accompanying drawings, in which.

2

Figures 6, 7:
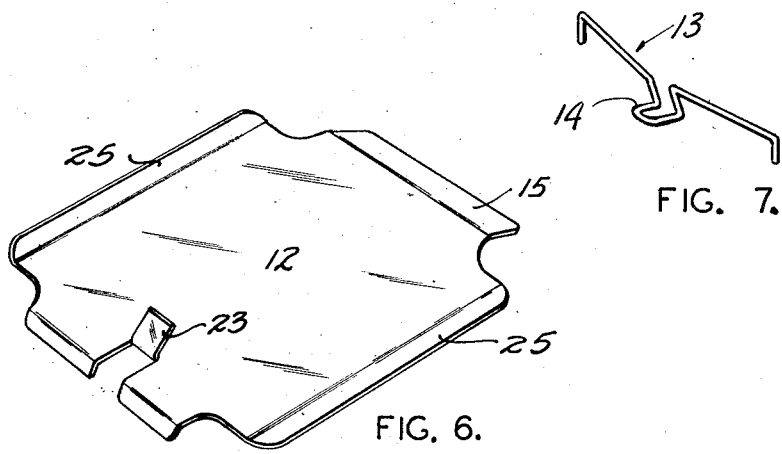
Figure 6 is a perspective of the crumb tray.

Figure 7 is a perspective of a tray supporting and expelling spring.

Figure 8:
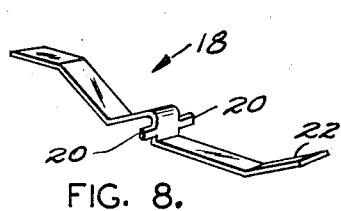

Figure 8 is a perspective of a tray release member.

The toaster body includes spaced bases 1 and 2, preferably of plastic and including handles 3 and 4 by which the toaster may be carried. Mounted on bases 1 and 2 is a casing 5, forming upright side, end, and top walls, the top wall being slotted at 6 to receive bread slices. Within the casing are mounted electric heating elements 7, slice supporting bars 8, and guard wires 9 in the usual manner. Enclosing these parts are upright plates 10 and 11, defining the lower portion of the toasting chamber.

The body has an open bottom and normally crumb tray 12 extends across this open bottom. At the right hand end of the toaster there is provided a wire spring 13 (Figure 7), the ends of which are seated in base 2. The intermediate portion of the spring is bowed to the left and is bent downwardly and looped forwardly to form a support 14 for the right hand end of the crumb tray, which may be flanged downwardly as indicated at 15 to permit support 14 to be positioned adjacent the bottom of base 2 while holding the major portion of tray 12 against the lower edges of plates 11.

The left hand end of tray 12 extends at 16 over upwardly facing shoulders 17 formed on base 1 when the intermediate portion of spring 13 is in its normal position.

Figure 1:
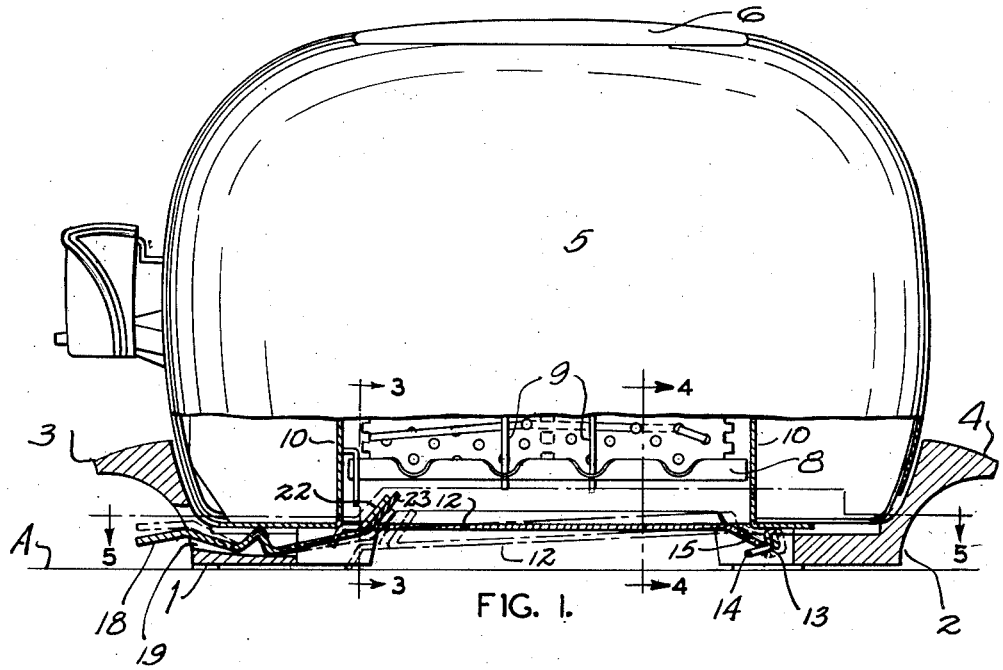
Figure 1 is in part a side elevation of a domestic toaster of the class described with the lower portion sectioned vertically along the center line of the toaster. The section is taken on line 1—1 of Figure 5.
Figure 3:
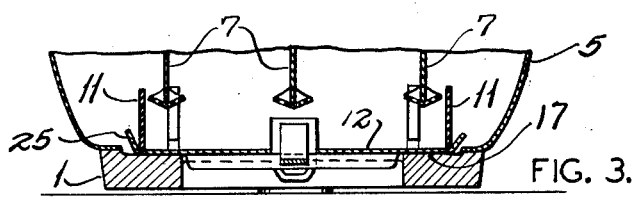
Figures 3 and 4 are detail transverse vertical sections taken on the corresponding section lines of Figure 2.
Figure 4:
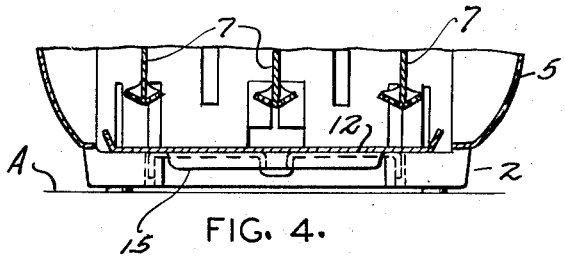

A lever 18 (Figure 8) extends through a horizontal passage 19 in base 1 and has ears 20 seated in recesses 21 in the base to fulcrum the lever. The inner end of the lever is inclined upwardly at 22 and overlies a similarly upwardly and inwardly inclined flange 23 on tray 12. The outer end of lever 18 projects from the body base 1 beneath handle 3 and may be grasped between the thumb and finger of the user to tilt lever 18 upon its fulcrum, whereupon its inclined inner end 22, pressing against tray flange 23, will first move the tray to the right against the thrust of spring 13, until the tray edges 16 ride off of shoulder 17 and the lever will move the adjacent end of the tray downwardly against the friction between the end of the tray and the inner face 24 of base 1, until the adjacent end of the tray is offset vertically from base 1, whereupon spring 13 will return to normal position, moving tray 12 to the dot-and-dash line position shown in Figure 1 and the toaster body may be raised by handles 3 and 4, leaving the tray resting upon the table, sink, or shelf surface A. Preferably the side edges 25 of tray 12 are bent upwardly to position the tray transversely of the toaster body (Figure 3).

Figure 2:
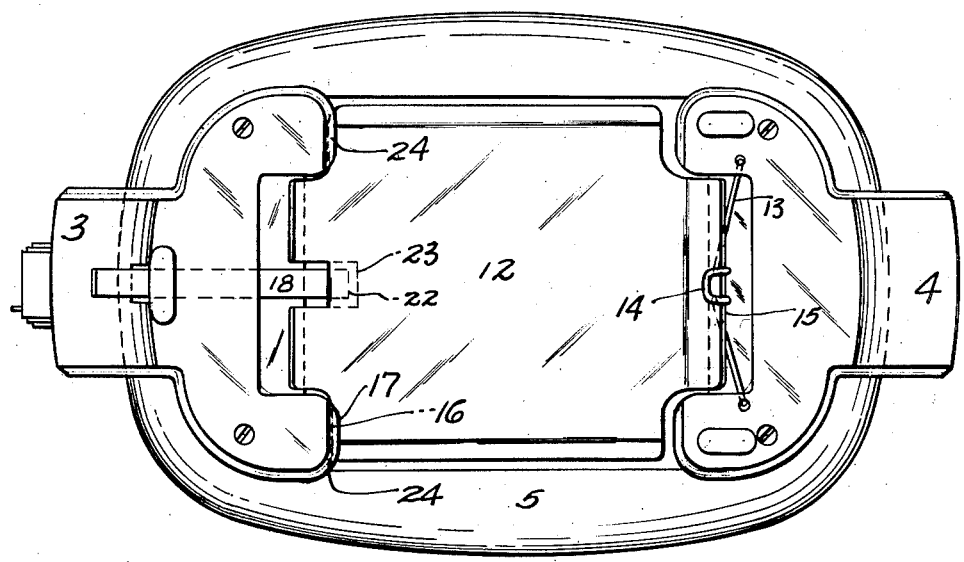
Figure 2 is a bottom view of the toaster.
Figure 5:
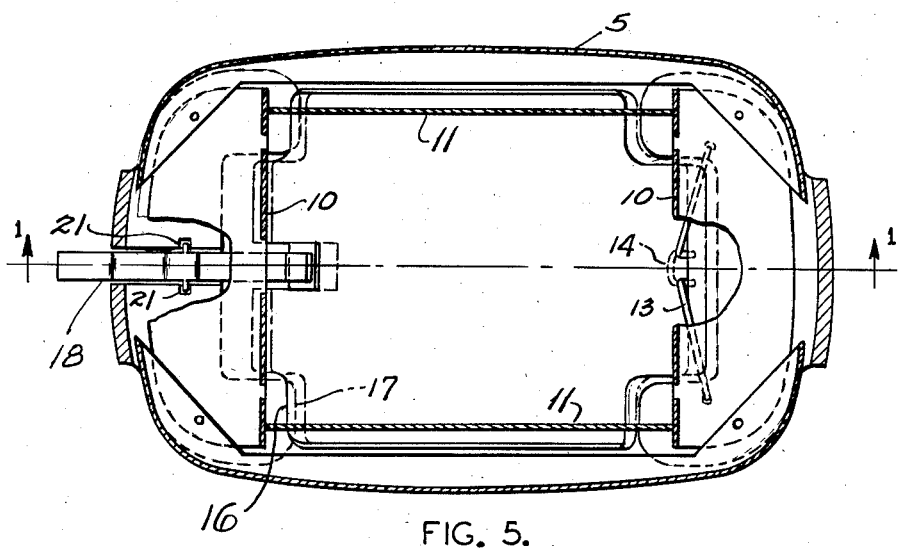
Figure 5 is a horizontal section taken on the line 5—5 of Figure 1.

When the tray is reassembled with the body, the user merely places the edge of flange 15 over support 14. The opposite end portion 16 of the tray will then rest against the inwardly facing end of base 1. By pressing upon the bottom of the tray, the edge 16 will ride to the top of the adjacent portion of base 1, whereupon the thrust of spring 13 will move the tray into the assembled position shown in Figures 1, 2 and 5.

With the structure described, the removal of crumbs from the tray takes only a few seconds and the operation described at some length above may be effected as simply as wiping off the casing with a cloth and this makes for frequent removal of crumbs, keeping the interior of the housing clean and avoiding fouling of the interior and corrosion of the metal parts within the housing.

Obviously, the details of the structure may be varied substantially without departing from the spirit of the invention and the exclusive use of those modifications coming within the scope of the claims is contemplated.

What is claimed is:

1. In a toaster, a body forming a toasting chamber, an upwardly facing shoulder on said body near one end of said chamber, a horizontally yielding spring mounted on said body adjacent the other end of said chamber, a crumb tray beneath said chamber with one edge normally seated on said shoulder and with its other edge engaging and distorting said spring, and a member movably mounted on the body with a portion projecting therefrom for manual engagement and with a portion engaging said tray to move it against the thrust of said spring out of engagement with said shoulder and downwardly below the level of the bottom face of the body.

2. In a toaster, a body including a toasting chamber, an upwardly facing shoulder on said body near one end of said chamber, a spring mounted on said body adjacent the other end of said chamber, a crumb tray with one edge seated on said shoulder and with its other edge engaging and distorting said spring, and a member pivoted on the body near said shoulder with an outer portion projecting from the body for manual engagement and with an inner portion inclined upwardly and inwardly of the toaster body, there being an opposing similarly inclined part on the tray holding it against upward movement by said spring, upward movement of the outer portion of said member pressing said member inner portion against said tray inclined part to thrust the tray from said shoulder laterally in one direction off of said shoulder and downwardly below said shoulder leaving the tray free to be discharged from the toaster by thrust in the opposite direction by said spring when freed from said shoulder.

3. In a toaster, a body surrounding a toasting chamber and having upright end walls, at least one of which has an outwardly projecting stationary handle, an upwardly facing shoulder on said body inwardly of one of said end walls, a spring mounted on said body adjacent the other end wall and distortable horizontally towards the adjacent wall, a horizontally disposed crumb tray with its periphery normally enclosed by said end walls and with one edge resting on said shoulder and with its other edge engaging and distorting said spring, the tray having an element near the first-mentioned edge inclined upwardly and rearwardly from said edge, and a lever fulcrumed intermediate its ends on said body with an outer portion extending below said handle and with an inner portion inclined over and substantially parallel to said tray element, the handle and the outer portion of said lever being engageable between opposed thumb and fingers of the user to move the inner portion of the lever downwardly and shift the tray to distort said spring and to free its first-mentioned edge from said shoulder.

PAUL J. McCULLOUGH.

References Cited in the file of this patent

UNITED STATES PATENTS

| Number | Name | Date |
|---|---|---|
| 1,230,384 | Delahant | June 19, 1917 |
| 1,756,784 | Johnson | Apr. 29, 1930 |
| 2,194,223 | Gough | Mar. 19, 1940 |
| 2,229,945 | Uhlrig | Jan. 28, 1941 |
| 2,257,906 | Gough | Oct. 7, 1941 |
| 2,300,323 | Tams | Oct. 27, 1942 |
| 2,404,915 | McCullough | July 30, 1946 |
| 2,542,231 | Campbell | Feb. 20, 1951 |
| 2,596,243 | Ireland | May 13, 1952 |